Figure 1:
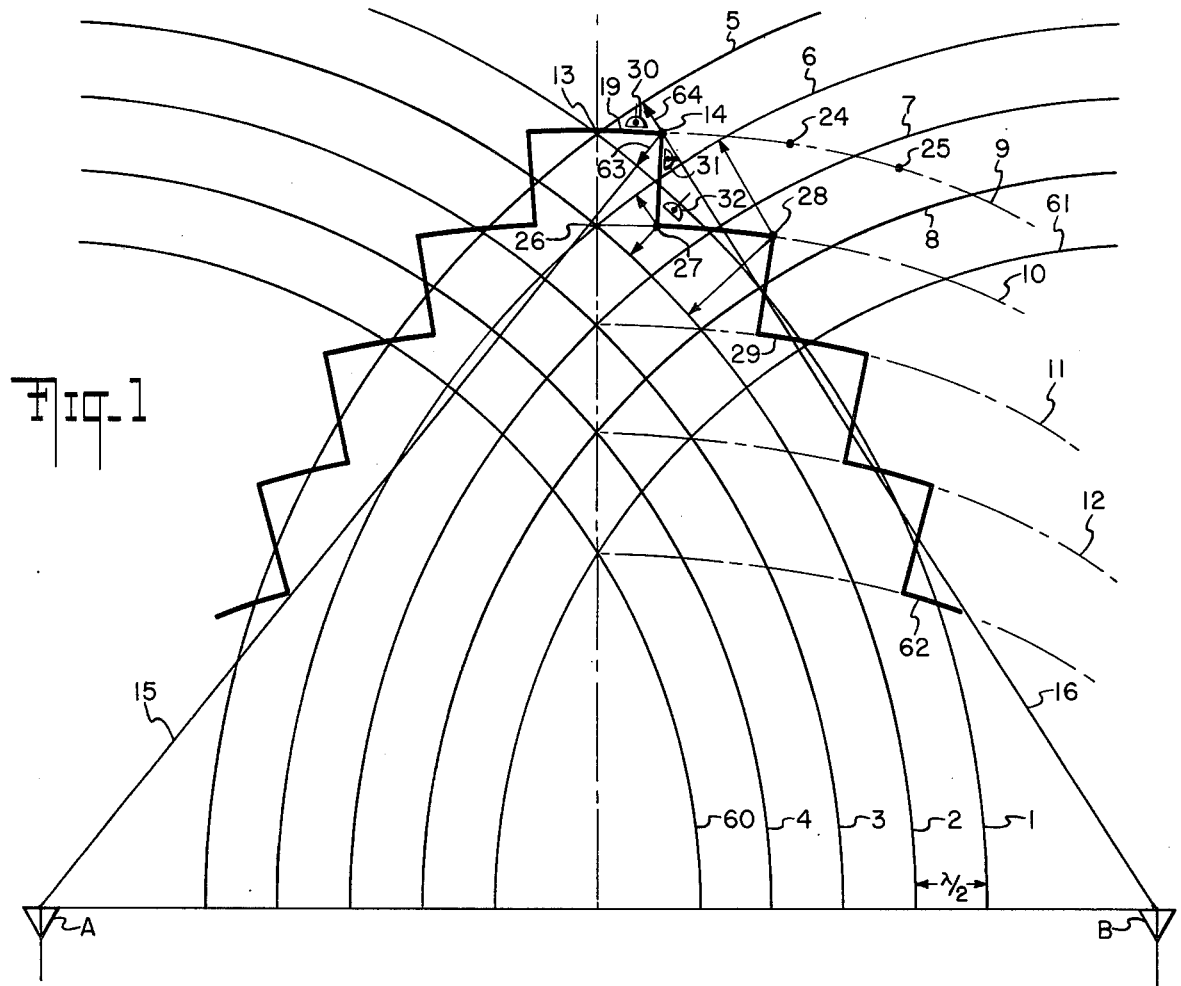

United States Patent [19]

Shizume

[11] 4,117,484
[45] Sep. 26, 1978

[54] ANGULAR DECEPTION COUNTERMEASURE SYSTEM

[75] Inventor: Peter K. Shizume, Glen Oaks, N.Y.

[73] Assignee: Sperry Rand Corporation, New York, N.Y.

[21] Appl. No.: 753,174

[22] Filed: Jul. 31, 1958

[51] Int. Cl.² .................................................. G01S 7/38
[52] U.S. Cl. .................................................. 343/18 E
[58] Field of Search ................ 343/6.5, 6.8, 18, 101.1, 343/11, 13, 7.5, 6.8 R, 18 E, 17.7; 250/15 T

[56] References Cited

U.S. PATENT DOCUMENTS

| | | | |
|---|---|---|---|
| 2,484,824 | 10/1949 | Hansel | 343/119 |
| 2,682,656 | 6/1954 | Phillips | 343/16.1 |
| 2,803,819 | 8/1957 | Blair | 343/11 |
| 3,480,951 | 11/1969 | Freedman | 343/6.8 R |

Primary Examiner—T.H. Tubbesing
Attorney, Agent, or Firm—Howard P. Terry

[57] ABSTRACT

1. A pair of electromagnetic energy transponders, each transponder comprising means for receiving incident microwave energy and means for transmitting said energy, said means for receiving and means for transmitting being interconnected in respective pairs by individual amplifying means, the electrical path lengths of said transponders being substantially identical, one of said transponders further including phase inverting means, and supporting means for spatially locating the receiving means of each of said transponders at respective extremities of a first straight line and for spatially locating the transmitting means of each of said transponders at respective extremities of a second straight line, said first and second lines being of equal length and coplanar.

3 Claims, 3 Drawing Figures

INVENTOR
PETER K. SHIZUME
BY
*L. S. Braddock*
ATTORNEY

ANGULAR DECEPTION COUNTERMEASURE SYSTEM

The invention relates to radar countermeasure systems and, more particularly, to a countermeasure system for producing angular error in enemy tracking radars.

By definition, a countermeasure device is one which tends to neutralize the target detection capabilities of an enemy radar. Such neutralization is accomplished by techniques which are broadly classifiable in two categories, one being of a "brute force" nature and the other being deceptive in nature.

In the case of the first technique category, the object is simply to overpower an enemy radar by the radiation of relatively large amounts of interfering microwave energy such as derived, for example, from a high power noise source. The effects of such noise jamming is to render ineffectual the enemy radar target detection and target tracking circuits.

The deception category of countermeasures equipment includes devices intended to confuse or deceive the enemy radar operator by the production, in addition to a true target indication, of a multiplicity of false targets. Depending on the nature of the deception apparatus, such false targets may be made to appear at random ranges and at random azimuths.

In the use of both the "brute force" and deception countermeasures techniques, the operator of the jammed enemy radar is ordinarily aware of the fact that his equipment is being jammed. The utility of these countermeasures systems lies in the fact that despite the knowledge that jamming is taking place, the enemy radar operator's efficiency in determining accurate target data is greatly reduced.

Irrespective of the technique employed in the countermeasures equipment, it is, of course, always desirable that the jamming equipment produce maximum effect with a minimum of apparatus. Additionally, it is important that jamming equipment produce false target data without necessarily disclosing that the target data is false.

It is the general object of the present invention to provide simplified radar countermeasures equipment for producing false target data in an enemy radar without disclosing the existence of a jamming signal.

Another object is to produce false angular data in a radar receiver.

A further object is to provide transmitting apparatus for the radiation of microwave energy having a discontinuous phase front.

These and other objects of the present invention, as will appear from a reading of the following specification, are achieved by the provision of a pair of spaced microwave energy transmitting means. Each of the transmitting means is associated with a respective microwave energy receiver. The receivers and transmitters cooperate in pairs to act as microwave energy transponders. The electrical path length separating the receiver and transmitter of each pair is adjusted to differ by 180° over a broad band of operating frequencies.

Microwave energy received from an interrogating enemy radar is received by each of the receivers and then transmitted by the respectively associated transmitters. The transmitted energies establish a composite phase interference pattern in space containing equi-phase contours having a plurality of discrete regions of discontinuity. By virtue of the 180° phase differential between the energies radiated by the two transponders, one of said regions of discontinuity is automatically maintained at the location of the radar. The effect of the interference pattern of microwave energy returned by the transponders to the interrogating radar is to produce false angular data in the radar.

Means are also provided in each of the transponders for amplifying the interrogating radar signal prior to retransmission. The gain of the amplifying means is adjusted so that the retransmitted energy is of an amplitude substantially greater than the amplitude of the normal radar echo which is reflected by the structure supporting the transponder system.

Figure 2:
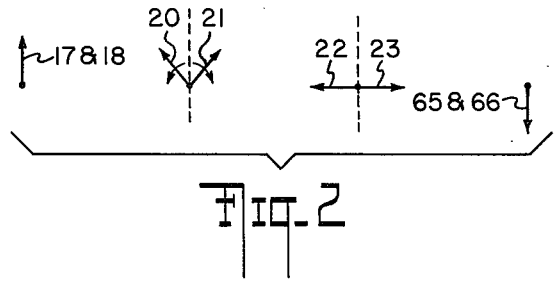
Figure 3:
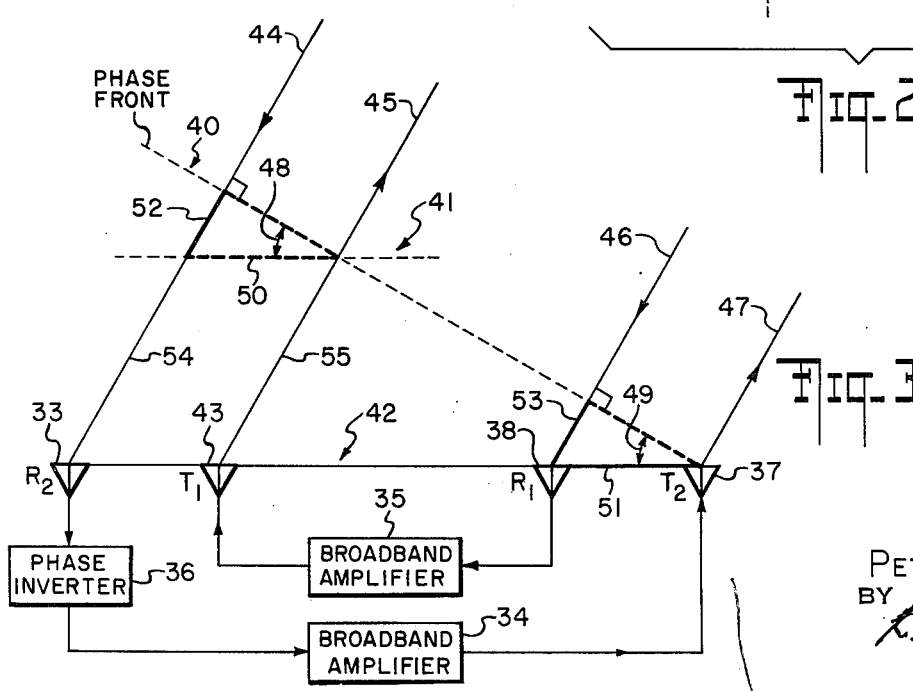

For a more complete understanding of the present invention, reference should be had to the following description and to the appended drawings, of which, FIG. 1 is a plot of the phase front of microwave energies transmitted by a pair of spaced radiators;

FIG. 2 is a series of vector diagrams useful in explaining the phase front plotted in FIG. 1; and FIG. 3 is a block diagram of a preferred embodiment of the present invention.

In FIG. 1, a pair of spaced radiators of microwave energy is indicated by the letters A and B. It is assumed that the energies as radiated by A and B differ by a constant phase angle, for example, zero degrees.

A plurality of arcs 1, 2, 3, 4 and 60 of concentric circles having a common origin at A is shown in the figure. A corresponding plurality of arcs 5, 6, 7, 8 and 61, each having the same radius as a respective one of the arcs 1, 2, 3, 4 and 60, are drawn about B as center. The difference in the radial distance between any adjacent pair of arcs is representative of half the electrical wavelength of the microwave energy emitted by radiators A and B.

As a consequence of the manner in which the arcs of FIG. 1 have been drawn, energy emitted by radiator A is everywhere in phase along each of the arcs 1, 2, 3, 4 and 60. Similarly, arcs 5, 6, 7, 8 and 61 also describe the loci of respective points along each of which the energy radiated by B is in phase. Assuming, for example, that the energy along corresponding arcs 1 and 5 may be represented by the phase angle zero, the energy along arcs 2 and 6 and along arcs 4 and 8 may be represented by the angle 180°.

The manner in which curves 9, 10, 11, 12 and 62 are plotted will now be described. Point 13 designates the intersection of arcs 1 and 5 which have the same radius of curvature. Therefore, the microwave energies emitted by radiators A and B arrive at point 13 in phase. At some point 14 along curve 9, the energies radiated by A and B arrive in phase opposition. This can be demonstrated as follows. Point 14 also defines the intersection of straight lines 15 and 16 respectively emanating from A and B. Lines 15 and 16 represent the straight line paths traversed by the radiated microwave energies. Point 14 of curve 9 is located outside arc 1 along line 15 by the same radial distance that it is located inside arc 5 along line 16. The equal radial distances (represented by vectors 63 and 64) are also equal to one-half of the separation between an adjacent pair of arcs such as arcs 1 and 2. As previously mentioned, the radial separation between adjacent arcs represents one-half an electrical wavelength at the operating frequency of A and B. Therefore, the phase of the energy from radiator A at point 14 lags the phase of the energy along arc 1 by 90°. Similarly, the phase of the energy from radiator B at point 14 leads the phase of the energy along arc 5 by 90°. The result is that the energy contributions from A and B are in phase opposition at point 14.

All of the other points lying along curve 9 are plotted in similar fashion. That is, curve 9 is the loci of points which are radially displaced by equal amounts from the intersecting arcs 1 and 5. Curves 10, 11, 12 and 62 are analogously plotted with respect to their corresponding intersecting arcs 6 and 2, 7 and 3, 8 and 4, and 61 and 60.

Because of the limited space available in the drawing, the arcs and curves are not shown in their true scalar locations with respect to the separation between radiators A and B. In a practical case, the radial distance of interest separating the arcs from their respective radiators is substantially greater (of the order of more than ten times) than the spatial separation between radiators A and B.

The amplitude of radiated microwave energy diminishes as a function of the square of distance from the source. Consequently, at substantial distances from radiators A and B, relative to the separation between A and B, the respectively radiated energies arrive at substantially the same amplitude. Therefore, it may be presumed that the energies from A and B are substantially equal in amplitude along each of the curves 9, 10, 11, 12 and 62. Of course, the equal energies along curve 9 will be less than the equal energies along curve 62, curve 9 being located at a greater distance than curve 62 from A and B.

The energies arrive at point 13 with equal amplitude and phase. It follows that as point 14 is approached, the amplitudes of the energies are substantially unchanged while the phases thereof vary in equal and opposite angular amounts. This is shown diagrammatically in the vector diagram of FIG. 2. Superimposed vectors 17 and 18 of FIG. 2 represent the equal amplitudes and equal phases of the energies radiated respectively by A and B which arrive at point 13 of FIG. 1. At some point 19, intermediate points 13 and 14 along curve 9, the energy arriving from A will lag the energy arriving from B, as previously described. Vector 20 represents the leading phase of the energy at point 19 from B and vector 21 represents the lagging phase of the energy at point 19 from A. Vectors 22 and 23 respectively represent the phase opposition of the energies at point 14.

By inspection of the successive vector diagrams of FIG. 2, it will be seen that the resultant microwave energy as could be monitored along curve 9 will either be in phase with an arbitrary reference or in phase opposition thereto. This follows from the fact that two substantially equal amplitude vectors rotating oppositely in equal angular amounts always produce a resultant which is either in phase with or in phase opposition to a reference phase angle.

Point 24 along curve 9 represents the second null at which the energies arriving from A and B are in phase opposition. It should be observed that the resultant energy appearing between points 13 and 14 is in phase opposition with the resultant energy appearing between points 14 and 24. Point 25 designates the third null along curve 9. The phase of the resultant energy at points intermediate 24 and 25 is again in phase with the resultant energy at points between 13 and 14. In short, the phase angle of the resultant energy along curve 9 is alternately in phase with and in phase opposition to a reference phase angle. A similar alternate phase opposition pattern exists along curves 10, 11, 12 and 62.

Referring now to curve 10, superimposed vectors 65 and 66 of FIG. 2 represent the equal amplitudes and phases of the energies arriving from A and B at point 26. Point 27 represents the first null along curve 10 which is established in the same manner as previously described with respect to point 14 along curve 9. Point 28 identifies the second null along curve 10.

It will be recalled that the phase difference between the energies along adjacent equiphase arcs, such as arcs 1 and 2, is 180°. Therefore, the phase difference between the resultant energies at points 13 and 26 (which lie respectively along arcs 1 and 2) is also 180°. For purposes of illustration, let it be assumed that the phase of the resultant energy between points 13 and 14 along curve 9 is 0° and between points 14 and 24 is 180°. Thus, the phase of the resultant energy between points 24 and 25 is also 0°. Correspondingly, the phase of the resultant energy between points 26 and 27 along curve 10 is 180° and between points 27 and 28 is 0°. The heavy shaded line 29 consequently defines one illustrative loci of points of constant phase of the resultant microwave energy produced by radiators A and B.

As is well understood in the art, conventional radar target tracking radars, for example sequential lobing or simultaneous lobing types, are responsive to lines of equal phase. That is, for the production of a maximum target signal in such radar receivers, the receiving antenna will tend to be aligned with a constant phase contour of the received microwave energy. It follows that such a phase contour sensitive receiving antenna would be oriented as shown at 30 in FIG. 1 if it were positioned between points 13 and 14. However, the antenna would tend to be oriented as indicated at 31 if positioned between points 14 and 27. Substantially accurate angular data can be derived from the tracking radar having an antenna oriented as shown at 30. On the other hand, a substantial amount of angular error would be introduced in the tracking radar if its antenna were oriented as indicated at 31. It should be noted that when the tracking radar antenna is oriented as at 31, the normal radar echo, returned from the structure or vehicle supporting radiators A and B, will be greatly reduced because the antenna is pointed away from the true direction of the vehicle. As a result, the tracking radar will indicate a false target lying at an erroneous angle while the true target return will be suppressed below the level of detectability.

Of course the angular error suggested by the antenna orientation of 31 is a maximum theoretical amount. As a practical matter, a conventional directive radar receiving antenna positioned as shown at 31 would not receive a resultant signal from A and B of sufficient amplitude to indicate the presence of a target; instead, it has been found that the tracking radar antenna will assume some modified orientation such as indicated at 32. The resultant angular error nevertheless is still sufficient to render useless the angular data produced in the tracking radar having an antenna oriented as shown at 32.

It will be observed that the relative phase of the microwave energies from A and B is 180° between points 14 and 27 along the equiphase contour 29. It follows that if such a 180° phase relationship can be automatically produced at the location of the tracking radar, a maximum angular error will always be produced. The present invention is particularly adapted to produce such a result.

A preferred embodiment of the present invention is shown in FIG. 3. The angular deception system of FIG.

3 is comprised of a pair of transponders each of which includes a receiving and transmitting antenna intercoupled by suitable waveguide and a broadband microwave amplifier. In addition, one of the transponder pairs includes means for shifting the phase of microwave energy by 180° over a broad band of frequencies. Such a broadband phase shifter may be provided by a simple 180° mechanical twist in the waveguide interconnecting receiving antenna 33 and broadband amplifier 34, for example.

Amplifiers 34 and 35 must be capable of amplifying received microwave energy over a relatively broad band of frequencies and must track each other in gain and phase shift over the entire operating band. Broadband amplifiers having such a characteristic are known in the art and include, for example, a distributed amplifier. The amplitude and phase stability of amplifiers 34 and 35 is necessitated by the requirement that the component vectors, such as vectors 17 and 18 of FIG. 2, along any equiphase contour such as line 29 of FIG. 1 must always be of substantially the same amplitude and phase irrespective of the frequency at which the transponders of FIG. 3 are operating. The operating frequency of the transponders, in turn, is determined by the frequency of the enemy tracking radar whose signal is received by receiving antennas 33 and 38.

One of the transponders is comprised of a receiving antenna 33, broadband phase inverter 36, broadband amplifier 34, and transmitting antenna 37. The other transponder is comprised of receiving antenna 38, broadband amplifier 35, and transmitting antenna 43. The amplifiers produce transponder gains substantially greater than the inherent echo signal gain of the structure or vechicle which supports the transponder system.

Dotted line 40 represents the phase front of microwave energy being received from a tracking radar. It will now be shown that the electrical path lengths from line 40, through the respective transponders and back to line 40 are equal. Line 41 is constructed parallel to line 42 along which the antennas 33, 43, 38 and 37 are located. Lines 44, 45, 46 and 47 represent essentially parallel rays of microwave energy received from the distant enemy tracking radar. Equal corresponding angles 48 and 49 are formed by the intersection of parallel lines 41 and 42 and phase front line 40. Structural means (not shown) support the antennas of the two transponders along line 42 so that the separation between antennas 33 and 43 is equal to the separation between antennas 38 and 37. Therefore, lines 50 and 51 are also equal as are lines 52 and 53 (subtended respectively by equal angles 48 and 49 of the respective congruent right triangles). Additionally, lines 54 and 55, defined by the intersection of parallel lines 41 and 42 and parallel microwave energy rays 44 and 45, are equal.

Thus, it can be seen that the electrical distance traversed by microwave energy in going from phase front 40 through either of the two transponders and back again to the position of phase front 40 is equal except for the 180° phase reversal produced by phase inverter 36. The result is that although incoming microwave energy along phase front 40 is in phase, the outgoing energies after radiation by antennas 43 and 37 are precisely out of phase with respect to each other when they again arrive at the location of phase front 40.

It should be noted that the phase relationship between the retransmitted microwave signals along lines paralleling the phase front of the incoming energy is always precisely 180° irrespective of the angle that the phase front makes with line 42. Consequently, the enemy tracking radar is automatically maintained at a null position (at which maximum angular error is produced) irrespective of the location of the tracking radar.

From the preceding, it can be seen that the objects of the present invention have been accomplished by the provision of a pair of microwave energy transponders having equal internal electrical path lengths. A broadband phase inverter is inserted in one of the transponders so that the signals radiated by the transponder transmitters are in mutual phase opposition. Each transponder further includes a broadband amplifier capable of amplifying microwave signals over a broadband of frequencies without the introduction of any amplitude or phase drift. The inherent operation of the angular deception transponder is to continually maintain an enemy tracking radar at a position at which maximum angular error is introduced into the tracking radar.

In the preferred embodiment of FIG. 3, the receiving and transmitting antennas of the two transponders are spatially located along the same straight line 42 with each of the antennas 33 and 37 of one transponder being displaced by an equal respective amount exterior to the antennas 43 and 38 of the other transponder. An alternative arrangement of the antennas which is also contemplated by the present invention is one whereby antennas 33 and 38 are separated by a line parallel to and equal in length to the line separating antennas 43 and 37. In the limiting case of FIG. 3, the two "parallel lines" just referred to both lie along the same line 42.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A pair of electromagnetic energy transponders, each transponder comprising means for receiving incident microwave energy and means for transmitting said energy, said means for receiving and means for transmitting being interconnected in respective pairs by individual amplifying means, the electrical path lengths of said transponders being substantially identical, one of said transponders further including phase inverting means, and supporting means for spatially locating the receiving means of each of said transponders at respective extremities of a first straight line and for spatially locating the transmitting means of each of said transponders at respective extremities of a second straight line, said first and second lines being of equal length and coplanar.

2. A pair of electromagnetic energy transponders, each transponder comprising means for receiving incident microwave energy and means for transmitting said energy, said means for receiving and means for transmitting being interconnected in respective pairs by individual amplifying means, the electrical path lengths of said transponders being substantially identical, one of said transponders further including phase inverting means, and supporting means for spatially locating said receiving and transmitting means along the same straight line such that the receiving and transmitting means of one of said transponders are each located by an equal respective amount along said line exterior to the receiving and transmitting means comprising the other of said pair of transponders.

3. A pair of electromagnetic energy transponders, each transponder comprising means for receiving incident microwave energy and means for transmitting said energy, said means for receiving and means for transmitting being interconnected in respective pairs by individual amplifying means, the electrical path lengths of said transponders being substantially identical, one of said transponders further including phase inverting means, and supporting means for spatially locating said receiving and transmitting means along a straight line such that the receiving and transmitting means of opposite transponders are mutually displaced by the same amount.

* * * * *